Figure 1:
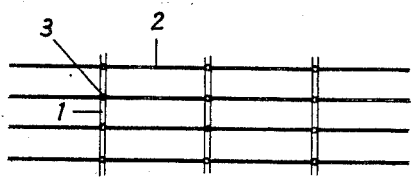

3,221,463
REINFORCEMENT GRID FOR CONCRETE
Hans Schoch, 44 Alfred Escherstrasse,
Zurich, Switzerland
Filed Feb. 15, 1963, Ser. No. 258,771
Claims priority, application Austria, Feb. 23, 1962,
A 1,518/62
1 Claim. (Cl. 52—645)

The invention relates to a reinforcement grid for concrete, with flexurally stiff reinforcement rods or irons lying parallel to one another and connected by flexible spacer members crossing the same. The grid is adapted to be embedded in the concrete and thus reinforce the same. Reinforcement grids of this kind have the advantage, that they can be rolled up during transportation prior to use and accordingly can be stored during transportation within areas of very small dimensions, e.g. for the construction of road surfaces. When laying the grid there are no difficulties encountered in spreading the same out evenly or to adapt the same to various road surface contours of given cylindrical camber, in contrast to reinforcement grids, consisting of elements welded to one another at the intersection points, wherein the spacer elements must have a considerable cross sectional area in view of the welding and consequently are not flexible and do not permit rolling. Welded grids are accordingly preferably produced, transported and laid in the form of panels, which involves comparatively high costs.

In spite of the advantages of flexible grids the same have not yet found general acceptance in the practice of concrete construction, namely because the reinforcement irons or rods and the flexible spacers displace themselves relative to one another at the points of intersection when laying them out, so that the connections and flexible spacers have to be restored to their correct positions, since otherwise large gaps may be formed between adjacent reinforcement irons or rods, which have to be obviated absolutely for safety reasons. It has been proposed to use sheet metal clamps, the legs of which are to be pressed over the grid elements at the intersection points. Tests carried out with such clamps have however proved, that they do not sufficiently prevent any slipping of the grid elements.

The invention has the primary objects of overcoming these disadvantages, while preserving the advantages, of a flexible reinforcement grid and of securing the intersecting points of the stiff reinforcement irons or rods and flexible spacer members against slipping along one another.

With these and other objects in view which will become apparent later from this specification and the accompanying drawing, I provide a reinforcement grid for concrete comprising in combination: flexurally stiff reinforcement irons or rods lying parallel to one another, flexible spacer members transversely crossing said reinforcement irons or rods and connecting the same with one another at their intersecting points, and holder means and safety means against slipping provided at each intersecting point of said reinforcement irons or rods with said spacer members.

Figure 2:
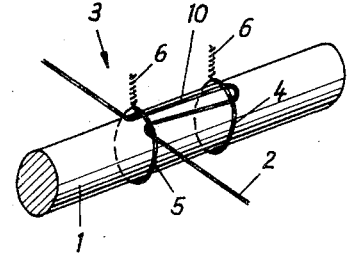
Figure 3:
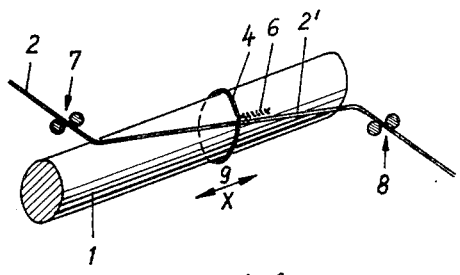
Figure 4:
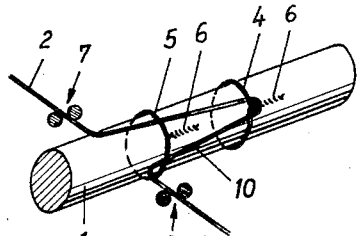
Figure 5:
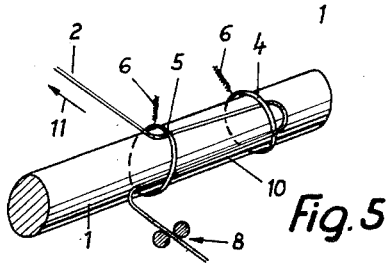
Figure 6:
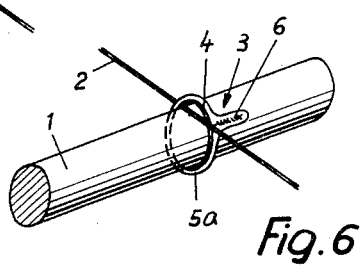

These and other features of my said invention will be clearly understood from the following description of two embodiments thereof given by way of example with reference to the accompanying diagrammatic drawing, in which:

FIG. 1 is a plan view of a flexible reinforcement grid,
FIG. 2 is a perspective view of an intersection point of the grid according to FIG. 1,
FIG. 3 is a perspective view of an intersection point according to FIG. 2 in a first phase of forming the connection,
FIG. 4 is a perspective view of an intersection point according to FIG. 2 in a second phase of forming the connection,
FIG. 5 is a perspective view of an intersection point according to FIG. 2 in a third phase of forming the connection, and
FIG. 6 is a perspective view of an intersection point of another embodiment of the grid according to the invention.

The reinforcement grid illustrated in FIG. 1 consists of flexurally stiff reinforcement bars or rods 1 of hard steel laid out paralled to one another, and of flexible wires 2 of soft annealed iron running at right angles thereto, which serve for spacing the reinforcement irons or rods 1 at the correct distances from one another, when a grid, rolled up for the transport, is spread out on the site. The reinforcement irons or rods 1 may be hard rolled steel bars, e.g. steel bars known under the registered trade mark "Tor," having a diameter of e.g. 10 to 30 millimeters. Instead of the bars 1 shown for the sake of simpler illustration, preferably pairs of intertwined wires are used, the diameters of which are for example between about 1.8 and 5 millimeters, such as the twin wire commercially available under the registered trade mark "Coppia." Such twin wires have as well known, good adhesion in the concrete. The spacing wire 2 have preferably diameters of only 0.10 to 0.25 millimeter. With such differences in cross-sectional areas it would be practically impossible to interweld the reinforcement bars 1 and the wires 2 with one another at the intersection points, quite apart from the fact, that hard steel is very badly weldable and suffers great losses in strength at the welding points.

At each intersection point 3, the reinforcement iron 1 is connected with the wire 2 by two wire loops 4 and 5, each of which is closed in itself. The wire loops 4 and 5 consist e.g. likewise of soft iron wire of about 0.10 to 0.25 millimeter diameter and are preferably produced in a binding apparatus described in the Austrian patent specification No. 201,401.

In order to close the loops 4, 5, the two ends of the loops wires are interwined, as illustrated at 6. The loops 4 and 5 are applied successively in accordance with FIGS. 3 and 4.

The wire 2 is passed through a stationary forked or slotted guide 7, which is located at one side of the reinforcement iron 1 adjacent the same. The wire 2 is moreover passed through a guide 8 of the same kind located on the other side of the iron 1, which however is movable to-and-fro along the iron 1 as indicated by the double arrow 9. The loop 4 is applied by means of the aforesaid binding apparatus, while the movable guide 8 is in the position shown in FIG. 3, with one part 2' of the wire 2 extending obliquely across the iron 1. If only one ("holder loop") 4 were employed the loop 4 could slip along the wire 1, and likewise the iron 1 with the loop 4 could slip along the wire 2, so that the grid member would be displaced and disarranged when being laid out. In order to prevent this, the second loop ("safety loop against slipping") 5 is applied, after the movable guide 8 has been shifted into the position of FIG. 4, wherein it lies opposite the guide 7. When the wire 2 is then taken out of the guides 7 and 8 and is stretched, it assumes the position illustrated in FIG. 2, wherein the tension prevailing in it produces a mutual clamping action of the parts 1, 2, 4 and 5 that—as tests have proved—any slipping of the intersecting points 3 along the iron 1 or along the wire 2 is practically impossible. It should be emphasized, that the wire 2 between the loops 4 and 5 forms a U-shaped turnout 10 comprising a pair of leg portions which are connected at their outer ends by an apex portion and forming at their other ends, in conjunction with the portions of wire 2 approaching the crossing or intersection point, oppositely directed foot portions. The portions of wire 2 approaching the crossing point, the foot portions and the leg portions all being formed continuously by the same wire. The said other ends of the pair of leg portions being passed through the safety loop 5 and the apex portion of said turnout is interlinked with the holder loop 4.

After the formation of the wire loops 4 and 5 according to FIG. 4, and after the spacer wire 2 has been bent U-shape along the reinforcing bar 1 by the travel of the guide 8 in the sense of the arrow 9 of FIG. 3, a pull force in the sense of the arrow 11 is applied to the spacer wire 2 in accordance with FIG. 5, while said wire is arrested in the guide 8, so that the loops 4 and 5 will be brought into an oblique position to frictionally hold the wire 2 in engagement with the reinforcement bar 1.

In the embodiment according to FIG. 6, on the intersection point 3 there is likewise provided a loop 4 of binding wire provided as a holding means for the iron 1 and the wire 2. As a safety means against slipping however in this case a layer 5a of a cementing agent is used, into which the loop 4, or at least parts thereof, are embedded as well as the adjacent portions of the wire 1. As a cementing agent e.g. the synthetic resin known under the registered trademark "Araldit" has proved its worth.

Instead of the loops 4 and 5 shown in FIGURES 1 to 5 inclusive formed of binding wire conventional sheet metal clamps could be used the legs of which are pressed round the grid elements 1 and 2. These clamps have however the disadvantage, that for any combination of diameters of the iron bars and wires specially dimensioned clamps have to be used, so that for the production of different grids a whole assortment of clamps would have to be provided. When, within one and the same grid, reinforcement irons of different diameters or of different kind (say single bars and intertwined twin wires) are provided, this disadvantage is particularly undesirable because of the risk of mixing-up the various clamps with one another.

It should be remarked that without the use of a holding means, e.g. of a loop 4 or of a sheet metal clamp, one does not succeed in connecting the irons or rods 1 and wires 2 durably with one another by cementing only; for the contact faces of the cementing agent layer on the elements 1 and 2 are of too small an area.

While I have described herein and illustrated in the accompanying drawings what may be considered typical and particularly useful embodiments of my said invention, I wish it to be understood, that I do not limit myself to the particular details and dimensions described and illustrated; for obvious modifications will occur to a person skilled in the art.

What I claim as my invention and desire to secure by Letters Patent, is:

A reinforcing grid for concrete structures comprising a series of bend resistant hard steel reinforcing rods disposed in spaced parallel relation, a series of continuous flexible soft iron spacing wires extending crosswise of said reinforcing rods at spaced crossing points therealong and connecting the same with each other, said reinforcing rods having a diameter substantially greater than said spacing wires, U-shaped turnouts formed at spaced intervals on each of said flexible spacing wires at each crossing point, each of said U-shaped turnouts having a pair of leg portions connected at their outer ends by an apex portion and provided at their other ends with oppositely directed bent foot portions continuous with each said spacing wires, said leg portions of each turnout engaging one of each of said reinforcing rods and extending longitudinally thereof with said apex portion extending transversely thereof, two binding loops of substantially the same material and diameter as said spacing wire securing said U-shaped turnouts to said reinforcing rods against sliding movement, one of said loops encircling the reinforcing rods at each of the crossing points of said spacing wires extending over one of said leg portions and under the remaining leg portion at the apex of each of said U-shaped turnouts, and the second loop encircling the reinforcing rod and extending over both legs of the U-shaped turnout adjacent the foot portions thereof, the longitudinal axis of the wires forming each of said binding loops lying in a plane, the planes containing said loops converging toward one another toward the side of the reinforcing rods to which the spacing wires are attached, wedging the spacing wires against the reinforcing rods.

References Cited by the Examiner

UNITED STATES PATENTS

| 718,009 | 1/1903 | Lyon | 52—686 |
|---|---|---|---|
| 955,110 | 4/1910 | White | 52—660 |
| 1,126,570 | 1/1915 | Rogers | 52—646 |
| 1,239,649 | 9/1917 | Waite | 52—669 |
| 1,389,942 | 9/1921 | Freyssinet | 52—662 |
| 1,674,086 | 6/1928 | Barton | 52—646 |
| 2,841,424 | 7/1958 | Richardson | 287—49 |
| 2,850,890 | 9/1958 | Rubenstein | 52—727 |

FOREIGN PATENTS 1,138,801   2/1957   France.

FRANK L. ABBOTT, *Primary Examiner.*

JACOB L. NACKENOFF, HENRY C. SUTHERLAND,
*Examiners.*